(12) United States Patent
Yong et al.

(10) Patent No.: US 8,792,510 B2
(45) Date of Patent: Jul. 29, 2014

(54) SYSTEM AND METHOD FOR PSEUDOWIRE PACKET CACHE AND RE-TRANSMISSION

(75) Inventors: Lucy Yong, McKinney, TX (US); Yang Peilin, Nanjing (CN)

(73) Assignee: Futurewei Technologies, Inc., Plano, TX (US)

( * ) Notice: Subject to any disclaimer, the term of this patent is extended or adjusted under 35 U.S.C. 154(b) by 504 days.

(21) Appl. No.: 13/049,299

(22) Filed: Mar. 16, 2011

(65) Prior Publication Data

US 2011/0228794 A1 Sep. 22, 2011

Related U.S. Application Data

(60) Provisional application No. 61/314,784, filed on Mar. 17, 2010.

(51) Int. Cl.
*H04L 12/56* (2006.01)
*H04L 1/18* (2006.01)
*H04L 12/46* (2006.01)

(52) U.S. Cl.
CPC ............... *H04L 1/1809* (2013.01); *H04L 12/46* (2013.01)
USPC .......................................... 370/412; 370/428

(58) Field of Classification Search
USPC .............................. 707/823, 803, 793; 718/1
See application file for complete search history.

(56) References Cited

U.S. PATENT DOCUMENTS

| | | | |
|---|---|---|---|
| 2007/0011318 A1* | 1/2007 | Roth | 709/224 |
| 2010/0142369 A1* | 6/2010 | Gottwerth et al. | 370/225 |
| 2010/0172361 A1* | 7/2010 | Scholl et al. | 370/401 |
| 2011/0222412 A1* | 9/2011 | Kompella | 370/241.1 |
| 2013/0003579 A1* | 1/2013 | Lu et al. | 370/252 |

OTHER PUBLICATIONS

Bryant, S., et al.,"Pseudowire Emulation Edge to Edge (PWE3) Control Word for Use Over an MPLS PSN," RFC 4385, Feb. 2006, 12 pages.
Martini, L., "Pseudowire Setup and Maintenance Using the Label Distribution Protocol (LDP)," RFC 4447, Apr. 2006, 34 pages.

* cited by examiner

*Primary Examiner* — Marcus R Smith
(74) *Attorney, Agent, or Firm* — Conley Rose, P.C.; Grant Rodolph; Rayhao Chung

(57) ABSTRACT

Disclosed is an apparatus that includes an ingress node configured to couple to an egress node and transmit a plurality of packets to one or more egress nodes, wherein at least some of the plurality of packets are cached before transmission and wherein the ingress node is further configured to retransmit a packet from the cached packets based on a request from one of the one or more egress nodes.

20 Claims, 13 Drawing Sheets

SYSTEM AND METHOD FOR PSEUDOWIRE PACKET CACHE AND RE-TRANSMISSION

CROSS-REFERENCE TO RELATED APPLICATIONS

The present application claims priority to U.S. Provisional Patent Application No. 61/314,784, filed Mar. 17, 2010 by Lucy Yong et al., and entitled "System and Method for Pseudowire Packet Cache and Re-Transmission," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames or packets from one node to another node across the network without using pre-configured routes on intermediate nodes. Other networks may forward the data frames or packets from one node to another node across the network along pre-configured or pre-established paths.

Multi-Protocol Label Switching (MPLS) has been used widely for packet transport. Pseudowire has also been used for encapsulating various services and transporting the services over packet switched networks (PSNs). The services may correspond to point-to-point (p2p) traffic or to point-to-multipoint (p2 mp) traffic. To make a PSN more cost effective, a carrier may use oversubscription to improve network utilization and lower service cost. Such optimization may cause traffic congestion, which may lead to dropping some packets transported within the PSN. In the case of a node or trunk failure, the network may be capable of rerouting packets over different paths or performing path protection. However, some packets may still be lost during the recovery time.

SUMMARY

In one embodiment, the disclosure includes an apparatus. The apparatus includes an ingress node configured to couple to an egress node and transmit a plurality of packets to one or more egress nodes, wherein at least some of the plurality of packets are cached before transmission and wherein the ingress node is further configured to retransmit a packet from the cached packets based on a request from one of the one or more egress nodes.

In another embodiment, the disclosure includes a network component. The network component includes a receiver configured to receive a plurality of packets and a cache memory configured to cache the selected packets from the plurality of packets, wherein the cache memory is further configured to assign a packet identifier (PID) to at least some of the selected packets. The network component also includes logic circuitry configured to receive a request for a lost transmitted-packet and retrieve a packet in the cache memory that matches the PID of the lost transmitted-packet. The network component further includes a transmitter configured to transmit the received packets and re-transmit the requested lost packet.

In a third aspect, the disclosure includes a method. The method includes receiving a packet, adding a next sequence number to the packet, and caching the packet in a cache. The method further includes transmitting the packet and retransmitting a cached packet that corresponds to a sequence number if a request to retransmit a packet is received, wherein the request to retransmit the packet indicates the sequence number of the packet to retransmit.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
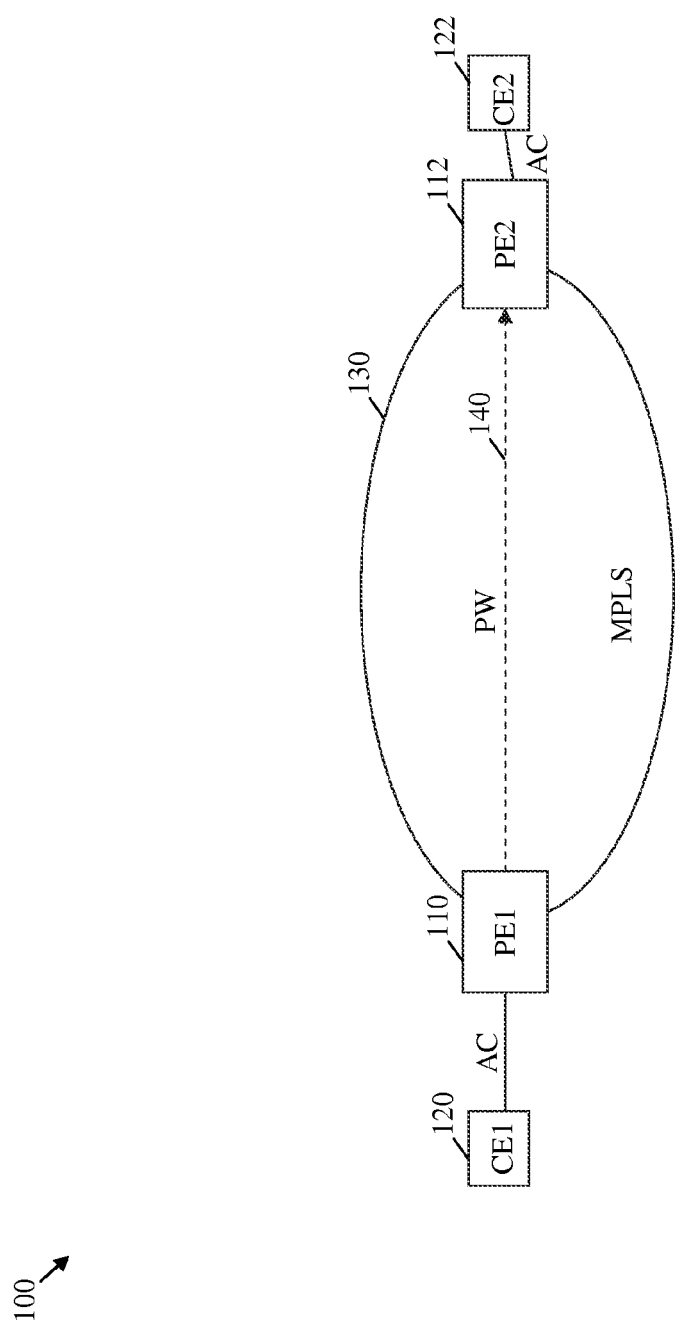
FIG. 1 is a schematic diagram of an embodiment of a PSN.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

With advancements in packet transport technology, more end user applications are becoming packet based applications. Such applications may use encoding methods to encapsulate information in a sequence of transported packets and decoding methods to recover the information from the transported packets. The performance of some application encoding schemes may be substantially affected by packet losses, such as video encoding applications. To achieve acceptable performance, an application may use a buffer at the receiving end point to tolerate variance in packet delay and/or allow packet reordering. However, if a packet is lost, the application may not be able to recover some information, which may impact a corresponding service for some time. Typically, in this case, the receiving end point may request from the sending point to retransmit the lost packet. Sending lost packets may require the receiving end point to be capable of handling packet disordering. Although the information may be recovered when a lost packet is retransmitted, the end user may experience a relative long time service disruption.

Advancements in electronic technology have also made cache technology more popular and low cost. Some networks, such as Content Distribution Networks (CDNs), may store information in multiple locations, which may allow end users to retrieve the information from corresponding nearby locations. A CDN may substantially reduce the need for packet transports, e.g., over relative long distances. However, in real-time streaming applications, such as streaming live news or live sports programs, the information may not be generated substantially ahead of the time of delivery or transport. The end users may need to view real-time streaming content at about the time the information is generated. In this case, packet loss during transport may substantially impact viewing the content and user experience. Retransmitting the lost packet from the originating point may reduce the impact of packet loss but may still cause some delay and disruption time. Thus, there may be a need for an improved and more reliable packet delivery method.

Disclosed herein is another method and system for improving packet delivery and accounting for packet losses during transport. The method is based on caching a plurality of packets and re-transmitting any lost packets, e.g., upon request. The system and method may be implemented in any packet based networks or PSNs, such as MPLS networks that use pseudowire (PW) technology. The packets may be cached, e.g., temporarily, by an ingress provider edge (PE) in the network, which may forward the packets to an egress PE via a PW. When the egress PE detects a lost packet, the egress PE may request from the ingress PE to retransmit the lost packet. Thus, the ingress PE may retransmit the lost packet that may be stored in the cache. The ingress PE may also remove the cached packets after some time. The packet caching and retransmission method may have some advantages over other packet delivery and recovery methods in PSNs, such as reduced delay and disruption time. The method may also allow carriers to offer different services with different priorities, where packets for some selected services may be cached to improve delivery and user experience while other packets for other services that have lower priority may not be cached.

FIG. 1 illustrates an embodiment of a PSN 100 that may be used to transport packets to and/or from clients. For instance, the PSN 100 may be a MPLS network, where packets may be transported based on labels in the packets. Based on the labels, the packets may be transported on virtual links or end-to-end circuits, e.g., without using the Open Systems Interconnection (OSI) model data link layer or layer two (L2). The packets may be transported between two end points or nodes using a PW, which is a point-to-point connection oriented service based on packet encapsulation. The PSN 100 may comprise an ingress PE (PE1) 110, an egress PE (PE2) 112, a first customer edge (CE1) 120, a second customer edge (CE2) 122, a MPLS network domain 130, and a PW 140.

The PE1 110 and PE2 112 may be edge nodes located in the same MPLS network domain 130. The PE1 110 and PE2 112 may be any nodes, components, or devices configured to receive and send packets in the PSN 100, such as switches, routers, or bridges. The CE1 120 and CE2 122 may be any customer nodes, components, or devices associated with corresponding end users, which may be coupled to the PE1 110 and PE2 112, respectively, via attachment circuits (ACs). The ACs may be point-to-point links established to transport packets between the customer edges (CEs) and the PEs. The CE1 120 and CE2 122 may be located outside the MPLS network domain 130, such as in different networks or domains or at customer distribution sites or residential locations. For instance, the CE1 120 and CE2 122 may comprise user devices (e.g., laptop or desktop computers, mobile phones, smart phones, etc.), access devices (e.g., modems or set top boxes), and/or distribution units (e.g., optical network units (ONUs)). The PW 140 may be established between the PE1 110 and the PE2 112 to exchange packet based traffic between the two end points. The traffic may comprise a plurality of services or applications that may have different priorities, which may include real-time applications, Internet data/services, and/or other network traffic.

The PE1 110 may be configured to receive a plurality of packets from the CE1 120, via an AC, and forward the packet to the PE2 112, via the PW 140. For instance, the CE1 120 may be a content service provider or distributor, such as a content server or an optical line terminal (OLT). The PE1 110 may encapsulate the packets from the CE1 120 properly before sending the packets over the PW 140. For instance, the PE1 110 may add PW encapsulation and a demultiplexer label to the packets before sending the packets to the PE2 112. The PE2 112 may receive the packets over the PW 140, de-capsulate the packets properly and forward the packets to the CE2 122, via a corresponding AC, which may be a subscriber. For instance, the PE2 112 may remove the PW encapsulation and the demultiplexer label from the packets before sending the packets to the CE2 122. Additionally, the PE1 120 may be configured to cache or temporarily store the packets received from the CE1 120, in a cache (e.g., in a memory storage unit) (not shown) at the PE1 110 before sending the packets via the PW 140. The packets may be cached at the PE1 110 for a determined time and then deleted or removed from the cache.

The PE2 112 may be configured to detect a lost packet in the received packets, e.g., by examining sequence numbers in the received packets that may be added by the PE1 110, as described below. A packet may be lost in the PSN 100 before arriving to the PE2 112 due to a node or link failure or to dropping the packet as a result of traffic congestion. If the PE2 112 detects a lost packet, the PE2 112 may indicate the lost packet to the PE1 110 and request from the PE1 110 to retransmit the lost packet, which may be cached at the PE1 110. Upon receiving the packet retransmission request from the PE2 112, the PE1 110 may retrieve the indicated lost packet from the cache and retransmit the packet. Since, the PE1 110 retransmits only the lost packets indicated by the PE2 112, the lost packets may be recovered and the amount of transported and retransmitted traffic over the PW 140 may be limited. This may reduce delay and disruption time at the PE2 112, and thus improve quality of service and user experience, which may be necessary for higher priority services or applications, such as real-time traffic.

Figure 2:
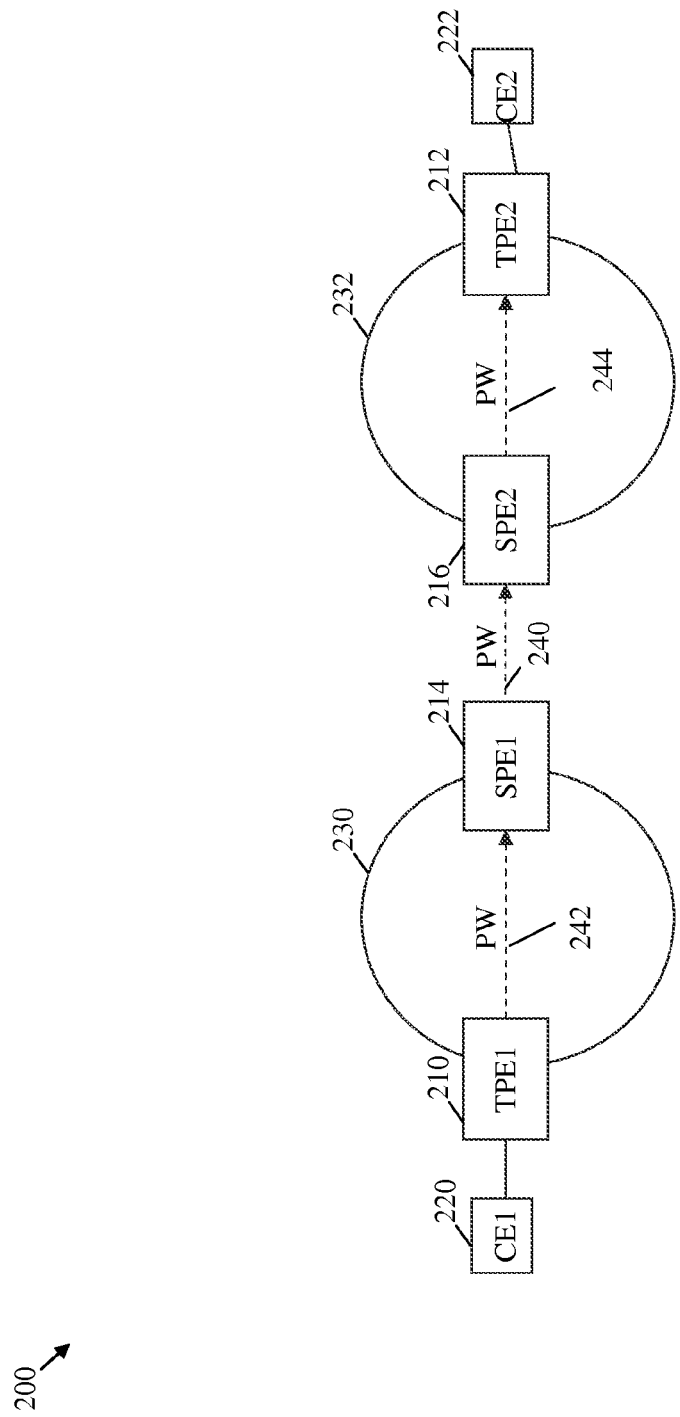
FIG. 2 is a schematic diagram of another embodiment of a PSN.

FIG. 2 illustrates an embodiment of another PSN 200 that may be used to transport packets to and/or from clients. The PSN 200 may be a MPLS network, where packets may be transported using PWs based on labels in the packets. The PSN 200 may comprise an ingress terminal PE (TPE1) 210, an egress terminal PE (TPE2) 212, an ingress segment PE (or SPE1) 214, an egress segment PE (SPE2) 216, a first customer edge (CE1) 220, a second CE (CE2) 222, a first MPLS network domain 230, a second MPLS network domain 232, and PWs 240, 242, and 244.

The TPE1 210 and SPE1 214 may be edge nodes located in the same first MPLS network domain 230. The TPE1 210 and SPE1 214 may be any nodes, components, or devices configured to receive and send packets in the PSN 200, such as switches, routers, or bridges. Similarly, the SPE2 216 and TPE2 212 may be edge nodes located in the same second MPLS network domain 232 and configured to receive and send packets in the PSN 200. The PW 240 may be established between the SPE1 214 and the SPE2 216 to exchange packet based traffic between the two corresponding end points at the first MPLS network domain 230 and the second MPLS network domain 232. Additionally, the SPE1 214 and the TPE1 210 may exchange traffic using a second PW 242 in the first MPLS network domain 230, and similarly the SPE2 216 and the TPE2 212 may exchange traffic using a third PW 244 in the second MPLS network domain 232. The traffic may comprise a plurality of services or applications that may have different priorities, such as real-time applications. The CE1 220 and CE2 222 may be configured substantially similar to the CE 120 and CE2 122, respectively. The CE1 220 may be coupled to the TPE1 210 and exchange traffic with the TPE1 210, e.g., via an AC. Similarly, The CE2 222 may be coupled to the TPE2 212 and exchange traffic with the TPE2 212, e.g., via a second AC.

The SPE1 214 may be configured to receive a plurality of packets from the TPE1 210 and forward the packet to the SPE2 216 via the PW 240, e.g., by adding PW encapsulation and a demultiplexer label to the packets. Initially, the packets may be sent from the CE1 220 to the TPE1 210, which may then forward the packets to the SPE1 214, e.g., via a second PW 242. The SPE2 214 may receive the packets over the PW 240 and forward the packets to the TPE2 212, e.g. via a third PW 244, which may in turn send the packets to the CE2 222. The SPE2 216 may replace the PW encapsulation and the demultiplexer label from the packets before sending the packets to the TPE2 212.

Additionally, the SPE1 214 may be configured to cache the packets received from the TPE1 210 in a cache (not shown) at the SPE1 214 before sending the packets via the PW 240. The packets may be cached at the SPE1 214 for a determined time and then deleted or removed from the cache. The SPE2 216 may be configured to detect a lost packet in the received packets, e.g., due to node or link failure or traffic congestion, by examining sequence numbers in the received packets that may be added by the SPE1 214. If the SPE2 216 detects a lost packet, the SPE2 216 may indicate the lost packet to the SPE1 214 and request from the SPE1 214 to retransmit the lost packet, which may be cached at the SPE1 214. Upon receiving the packet retransmission request from the SPE2 216, the SPE1 214 may retrieve the indicated lost packet from the cache and retransmit the packet.

In other embodiments, a similar packet caching and retransmission scheme may be implemented in any type of packet based networks, where nodes may send and receive a plurality of packets. For instance, a network may comprise an ingress node configured similar to the PE1 110 or SPE1 214 and an egress node configured similar to PE2 112 or SPE2 216. The ingress node and egress node may be edge nodes, core nodes, or any nodes in the network. Specifically, the ingress node may be configured to add consecutive sequence numbers to a sequence of packets and cache each of the packets (e.g., for some time) before transmitting the packets to the egress node. The egress node may be configured to receive each packet, examine the corresponding sequence number to determine whether a packet was lost, and signal the ingress node if a lost packet is detected. The egress node may also indicate to the ingress node the sequence number of the lost packet. Hence, the ingress node may identify the lost packet in the cache based on the sequence number and retransmit the cached packet to the egress node.

If the ingress node cannot locate the sequence number and thus the corresponding packet in the cache, the ingress node may ignore the request. This may be the case if the indicated packet was already retransmitted and removed from the cache or if the cache was reset or cleared, e.g., after some caching time expires or the cache is full. In some embodiments, the ingress node may be coupled to the egress nodes via a point-to-multi-point link, e.g., via a plurality of corresponding PWs. As such, the ingress node may cache the packets for all the egress nodes and may retransmit the requested packets for each egress node upon request over the corresponding link or PW.

When the packets are cached at an ingress node or PE, such as the PE1 110 or the SPE1 214, before sending the packets over a PW, the packets may be individually identified using a corresponding sequence number, for instance as described in the Internet Engineering Task Force (IETF) Request for Comments (RFC) 4385, which is incorporated herein by reference. For instance, the ingress PE may add a sequence number to each packet before caching and forwarding the packet. Additionally, if the ingress node or PE is not configured or enabled to cache packets, the sequence number in the packets may be set to about zero, which may indicate to the egress node or PE (e.g., the PE2 112 or SPE2 216) that packet caching is disabled or is not supported at the ingress PE.

The sequence numbers may be added to the packets according to the following rules:

- A first packet in a sequence of cached and transmitted packets may be assigned a sequence number equal to about one.
- Subsequent packets in the sequence of packets may be assigned sequence numbers each incremented by about one with respect to the previous packet.
- The sequence number that follows a sequence number of about 65,535, e.g., that corresponds to a maximum unassigned 16 bit number, may be set to about one to reset the sequence numbers and reset the cache.
- Packets that are transmitted without caching may be assigned a sequence number with value of about zero.

The ingress node or PE may receive a plurality of packets that correspond to different applications or customers and have different priorities. Some of the received packets that have higher priority or importance may be cached at the ingress node while other packets with lower priority or importance may be transmitted without caching. The egress node or PE may tolerate the loss of some of the non-cached packets but may request the retransmission of lost packets that may be cached, e.g., that may have a sequence number greater than about zero. The ingress node may selectively cache incoming packets, e.g., based on priority or quality of service (QoS) requirements, or operator specified policy, to reduce the amount of cached traffic, cache processing time, cache size, or combinations thereof. The high priority or important packets may be cached and may also be marked as non-drop eligible. Marking a packet as non-drop eligible reduces the possibility of dropping these packets, which reduces the possibility of re-transmission and improves the transport quality.

The packets may be cached for some time at the ingress node, and the cached packets may be refreshed after that time. Alternatively, the cache may be reset and the packets may be removed after some time. The cache time may be a fixed determined time or may depend on a maximum quantity of packets that may be stored in the cache limited size. For example, the maximum allowed quantity of cached packets may correspond to a maximum unassigned 16 bit number, e.g., about 65,536 packets. The cache time may be long enough to allow the egress node to receive the transported packets, detect packet loss, and notify the ingress node of a lost packet. For P2MP PW, there are multiple egress nodes, thus an ingress node may receive the requests for re-transmitting packet from individual egress nodes. In one embodiment, an ingress node sends retransmitting packets as a unicast packet via P2P PW.

In an embodiment, when a PW (e.g., the PW 140 or PW 240) is established between an ingress node and an egress node, the egress node may initialize an expected sequence number parameter or value to about one. The expected sequence number parameter at the egress node may indicate the expected sequence number for the next received packet over the PW from the ingress node. When the egress node receives a packet over the PW, the egress node may process the sequence number of the received packet according to the following rules:

If the sequence number in the packet is equal to about zero, then the packet is not cached at the ingress node and the packet may be forwarded without additional processing.

If the packet's sequence number is greater than zero and equal to the expected sequence number value, then the packet may be forwarded and the expected sequence number parameter may be incremented by about one.

If the packet's sequence number is greater than zero and is not equal to the expected sequence number value, then the egress node may compute which sequence numbers are not received or are lost, e.g., as described in RFC 4385. For example, the sequence numbers of the lost or non-received packets may be equal to the difference between the last received sequence number and the expected sequence number value. The egress node may then generate and send a message to the ingress node to request the non-received packets. The message may comprise or indicate the sequence numbers of the non-received packets. After requesting the lost packets, the egress node may set the expected sequence number to the value of the last received sequence number plus one.

If the packet's sequence number is less than the expected sequence number value, then the egress node may evaluate the packet to determine if the packet is the retransmitted packets by looking at the retransmission bit; if yes, the node may forward the packet toward an AC; if not, the node may drop the packet and raise an alarm.

As an alternative, when an ingress node re-transmits a cached packet, the ingress node may set the sequence number to zero in the packet, thus, the egress node may treat the retransmitted packet as a non-cached packet, which simplifies the process.

Additionally, if the egress node receives a packet with a sequence number that is not equal to about zero, then the egress node may set the expected sequence number to the value of the received sequence number plus one. If the received sequence number is equal to about 65,535, then the expected sequence number value may be set to about one. Further, if the egress node is not configured to receive cached and retransmitted packets and the egress node then receives a packet with a sequence number that is not equal to about zero, then the egress node may send a PW status message to the ingress node that indicates a receive fault. In this case, the egress node may also disable the PW link with the ingress node. The egress node and the ingress node may negotiate whether to exchange cached and retransmitted packets upon establishing the PW between the two nodes. In the procedures and rules described above for the ingress node and the egress node, the time needed to re-circle or reset the sequence numbers at the ingress node, e.g., from 65,535 to one, may be longer than the time needed to implement caching and retransmission for a sequence of packets associated with the sequence numbers.

Figure 3:
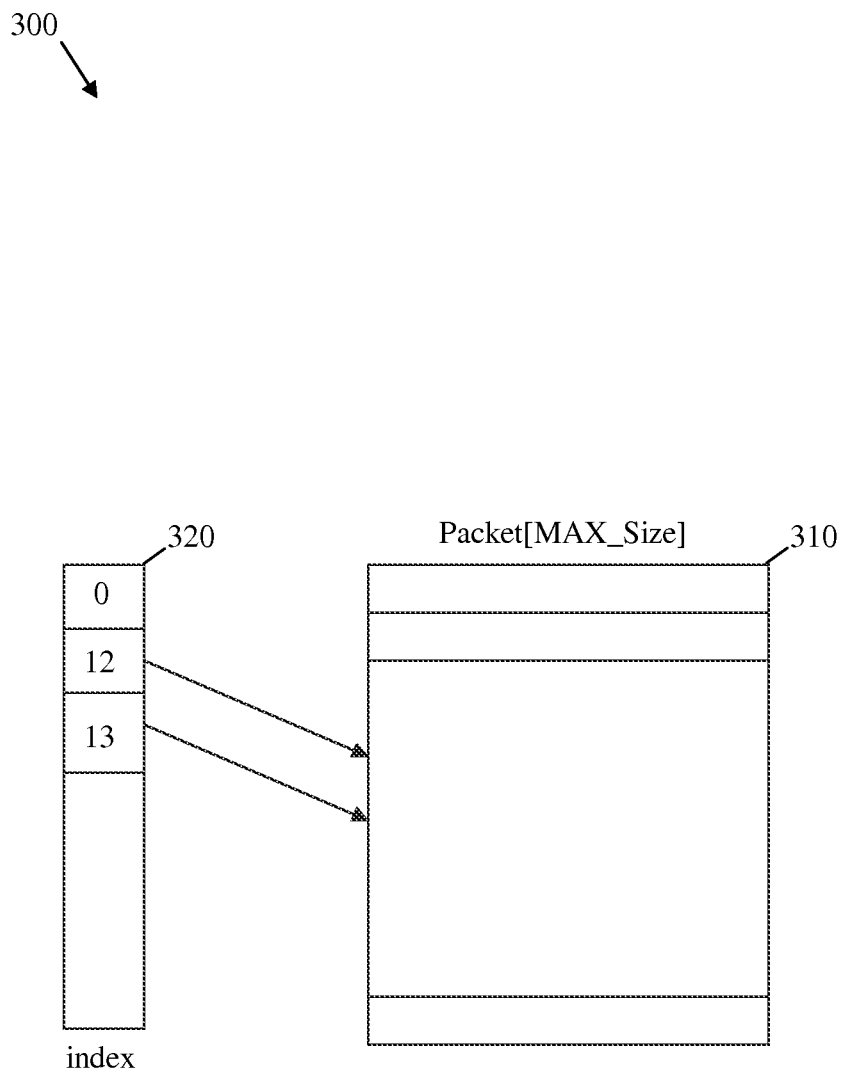
FIG. 3 is a schematic diagram of an embodiment of a packet cache design.

FIG. 3 illustrates an embodiment of a packet cache design 300 that may be used to cache a sequence of packets. Each of the packets may be cached at the ingress node before sending the packet to the egress node. The packet cache design 300 may comprise a table 310 for caching or storing a plurality of packets and an index list 320 for indexing the entries in the table 310. The table 310 and the index list 320 may be maintained in a memory storage unit at the ingress node. The table 310 may store a sequence of cached packets before transmission. The packets may be cached one by one in the order of transmission. The table 310 may store up to about a maximum size (MAX-size) of total packets, e.g., up to about 64 kilobytes. The maximum size of total packets may be determined based on the transmission delay between the ingress node and the egress node and the number of cached packets per second. For example, the total number of packets may be less than or equal to about 65,536.

The index list 320 may comprise a plurality of row numbers that correspond to the rows in the table 310. The index list 320 may comprise a quantity of row numbers that is equal to about the quantity of rows and thus packets in the table 310 or the quantity of rows incremented by about one. For example, the index list 320 may comprise up to about 65536 row numbers. Each row number in the index list 320 may map one to one to a packet identifier (PID) in a packet cached in a corresponding row in the table 310. The PID may represent the sequence number of the packet. For example, a first row number in the index list 320 may be set to zero, e.g., to indicate the start of the index list 320. A second row number in the index list 320 may be set to 12 to indicate a first packet with PID equal to one in the $12^{th}$ row in the table 310. Similarly, a third row number in the index list 320 may be set to 13 to indicate a second packet with PID equal to two in the $13^{th}$ row in the table 310.

Figure 4:
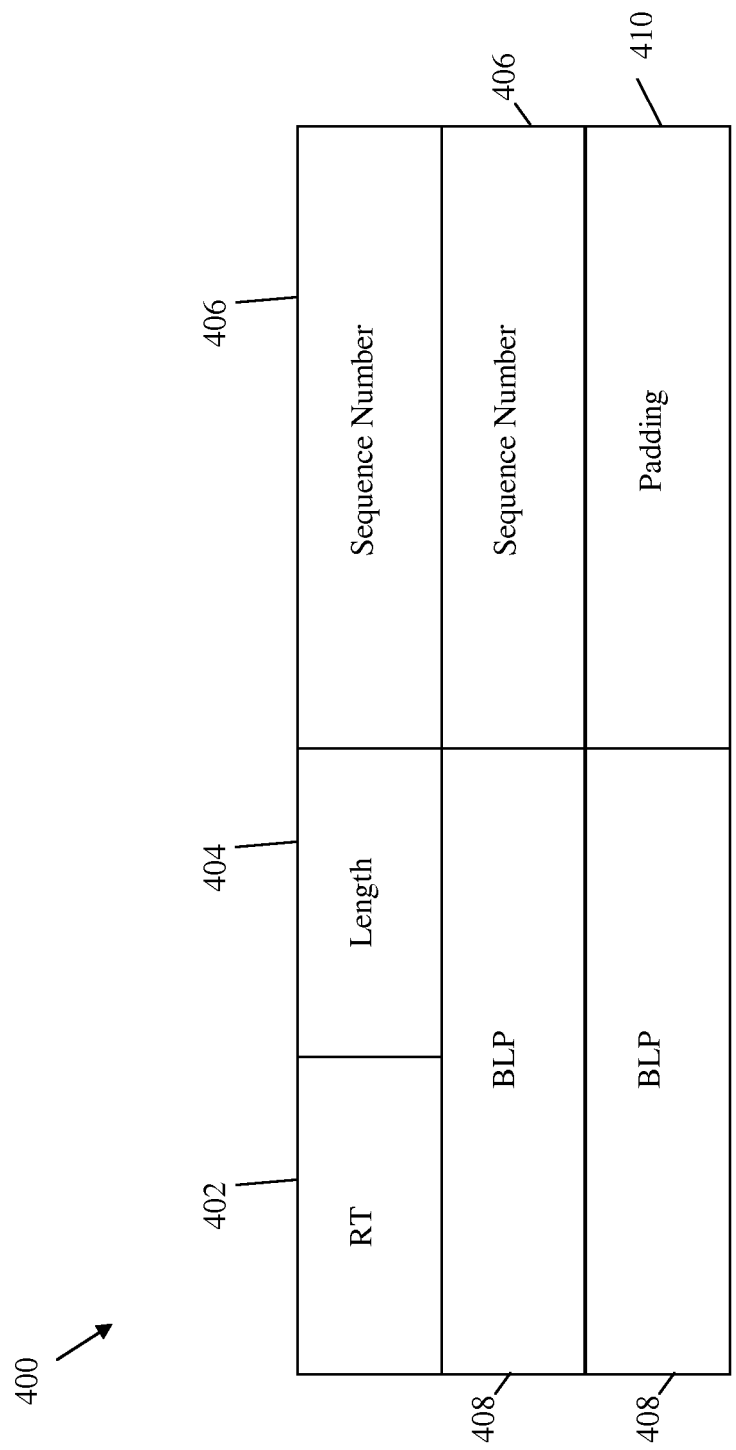
FIG. 4 is a schematic diagram of an embodiment of a retransmission type-length-value (TLV).

FIG. 4 illustrates an embodiment of a retransmission TLV 400 that may be sent by the egress node to the ingress node to request retransmission of a lost or non-received packet. The retransmission TLV 400 may be sent in a message or may be a sub-TLV sent in another TLV. The retransmission TLV 400 may comprise a retransmission type (RT) field 402, a length field 404, one or more sequence numbers 406, and one or more corresponding bitmasks of following lost packets (BLPs) 408. The retransmission TLV 400 may also comprise padding 410 if needed, which may comprise a plurality of zero bits.

The RT field 402 may indicate that the retransmission TLV 400 is a retransmission type TLV for requesting a packet retransmission and may be assigned by the Internet Assigned Numbers Authority (IANA). The length field 404 may indicate the size of the retransmission TLV 400, e.g., in octets, and may be a multiple of about 16. Both the RT field 402 and the length field 404 may have a size of about eight bits. Each sequence number 406 may specify one lost packet that may be detected by the egress node. Each BLP 408 may comprise a plurality of bits that indicate one or more lost packets following the packet indicated by the corresponding preceding sequence number 406. Both the sequence number 406 and the BLP 408 may have a size of about 16 bits. The BLP 408 may be used to indicate whether any of about 16 packets following the packet associated with the corresponding sequence number 406 is lost. From the list of about 16 bits in the BLP 408, the bits that correspond to the lost packets may be set to about one and the bits that correspond to the successfully received packets may be set to about zero. Accordingly, a bit i in the list of about 16 bits may be set to about one if the egress node has not received or detected a packet sequence number (SN+i) (modulo2^16) to indicate that the corresponding packet is lost, where SN is the corresponding sequence number 406. Otherwise, the bit i may be set to about zero. For example, the least significant bit of the BLP 408 may be set to one if the packet that corresponds to the corresponding sequence number 406 and the following packet were both lost. If the bits from the second bit through the 15$^{th}$ bit in the BLP 408 are set to about zero, then the corresponding packets may not be reported to the ingress node as lost packets. However, this does not necessarily indicate that the corresponding packets were successfully received by the egress node.

Figure 5:
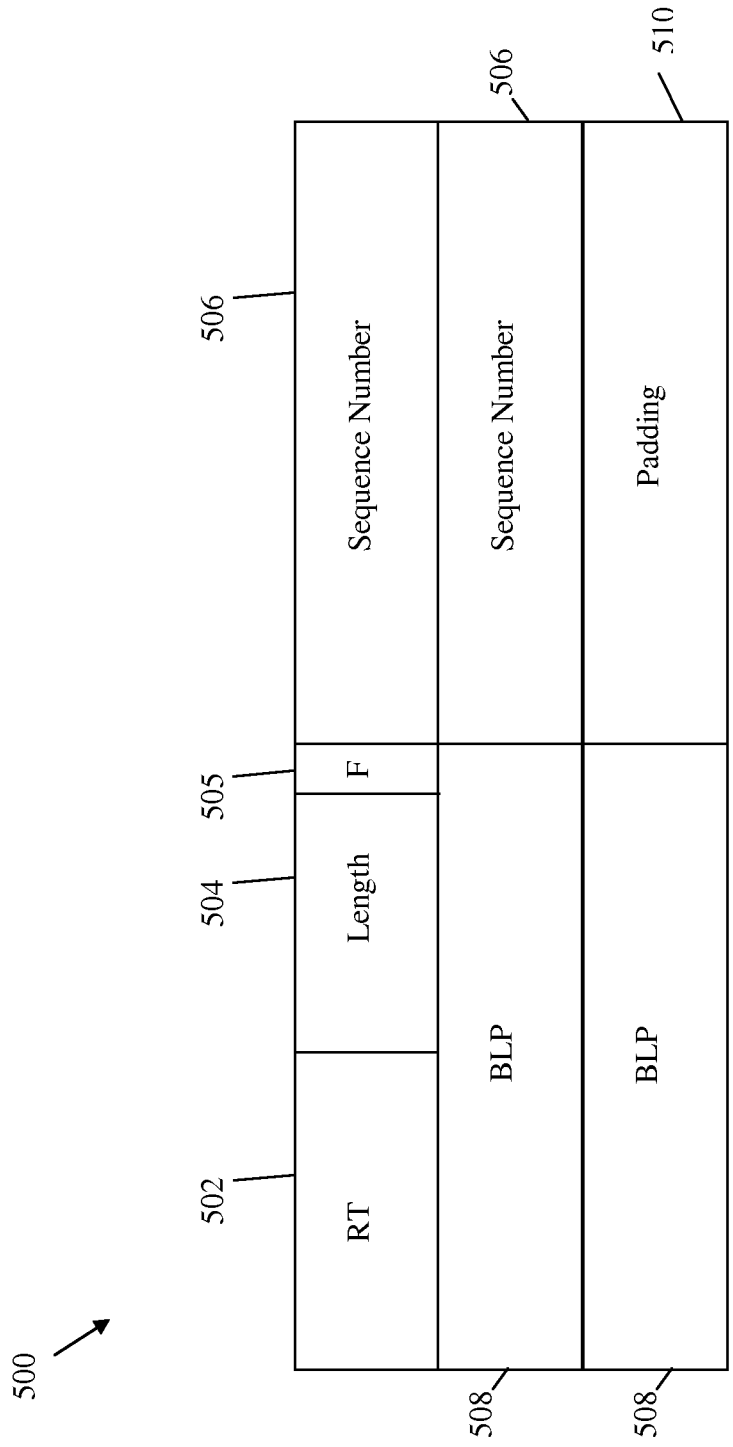
FIG. 5 is a schematic diagram of another embodiment of a retransmission TLV.

FIG. 5 illustrates an embodiment of another retransmission TLV 500 that may be sent by the egress node to the ingress node to request retransmission of a lost or non-received packet. The retransmission TLV 500 may be sent in a message or may be a sub-TLV sent in another TLV. The retransmission TLV 500 may comprise a RT field 502, a length field 504, a flag (F) bit 505, one or more sequence numbers 506, and one or more corresponding BLPs 508. The retransmission TLV 500 may also comprise padding 510 if needed, which may comprise a plurality of zero bits.

The RT field 502, length field 504, sequence numbers 506, and BLPs 508 may be configured substantially similar to the RT field 402, length field 404, sequence numbers 406, and BLPs 408, respectively. However, the length field 504 may have a size of about 7 bits. The F bit 505 may be set to about one to indicate that the retransmission TLV 500 indicates a range of sequence numbers for a sequence of lost packets. In this case, the retransmission TLV 500 may comprise a first sequence number 506 that corresponds to the first sequence number in the range and a second sequence number 506 that corresponds to the last sequence number in the range. Although, the F bit 505 may be set to about zero to indicate one or more individual sequence numbers 506 included in the retransmission TLV 500.

Figure 6:
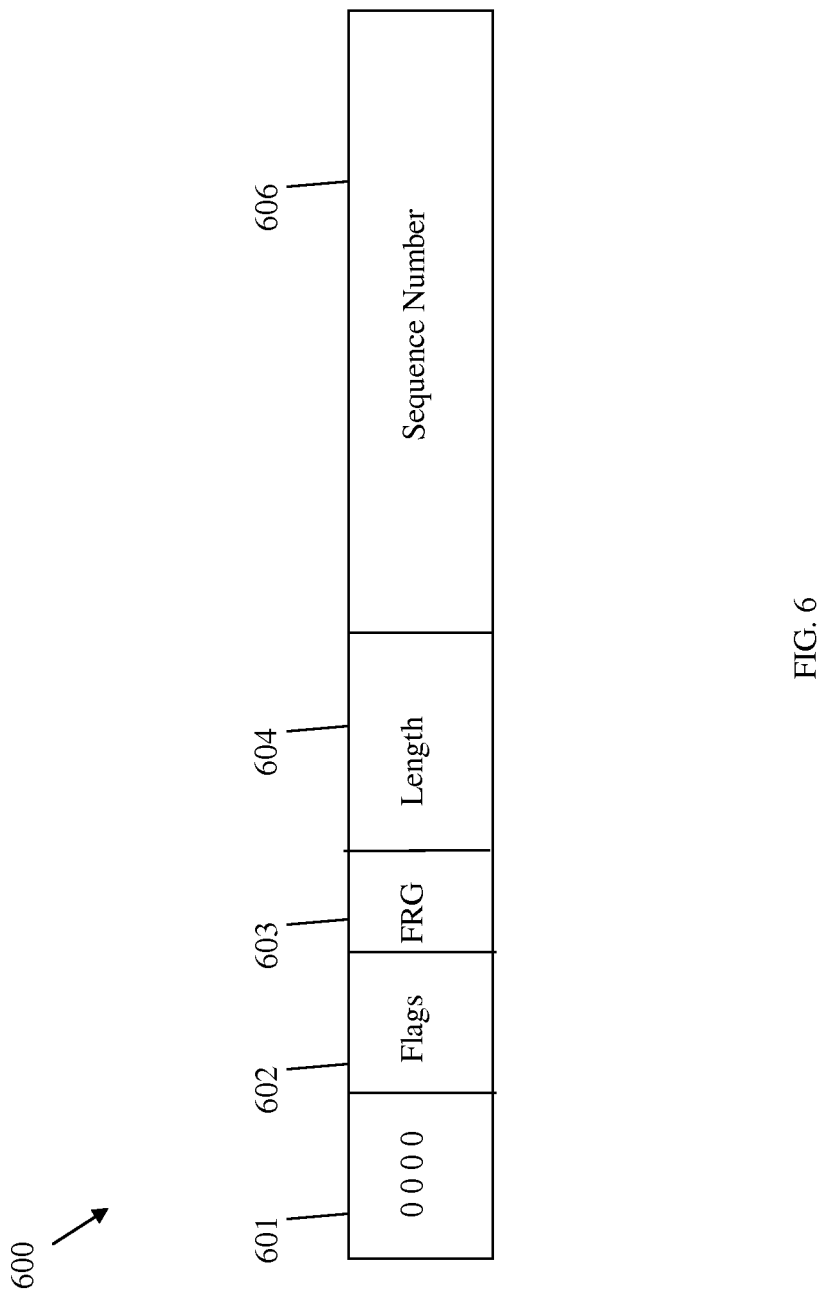
FIG. 6 is a schematic diagram of an embodiment of a retransmission control word (CW).

FIG. 6 illustrates an embodiment of a retransmission CW 600 that may be used to differentiate retransmitted packets and initially transmitted packets. The retransmission CW 600 may be sent in the transmitted packets from the ingress node and may be received and detected by the egress node. The retransmission CW 600 may comprise a sequence of bits 601, a plurality of flags 602, a fragmentation bit (FRG) 603, a length field 604, and a sequence number 606. The length field 604 and the sequence number 606 may be configured similar to the length field 404 and the sequence number 406, respectively. The flags 602 and FRG 603 may comprise a plurality of bits that may be set to indicate different control information. The ingress node may use one of the bits, e.g., the second bit, in the sequence of bits 601 to indicate whether the packet is a retransmitted or initially transmitted packet. The ingress node may set the bit to about one if the packet is retransmitted or to about zero if the packet is initially transmitted. When the egress node detects that the packet is retransmitted, the egress node may forward the packet and delete or remove the sequence number 606 from a list of saved sequence numbers that correspond to lost packets or packets requested for retransmission.

When a PW is established between the ingress node and the egress node, the ingress node may signal its capability to perform caching and retransmission to the egress node, for instance using label distribution protocol (LDP) signaling, as described in RFC 4447, which is incorporated herein by reference. As such, a PW interface parameter TLV may be used to synchronize the cache and retransmission capability between the ingress node and the egress node. Alternatively, the cache and retransmission capability may be signaled using Border Gateway Protocol (BGP) or Resource Reservation Protocol-Traffic Engineering (RSVP-TE) signaling.

Figure 7:
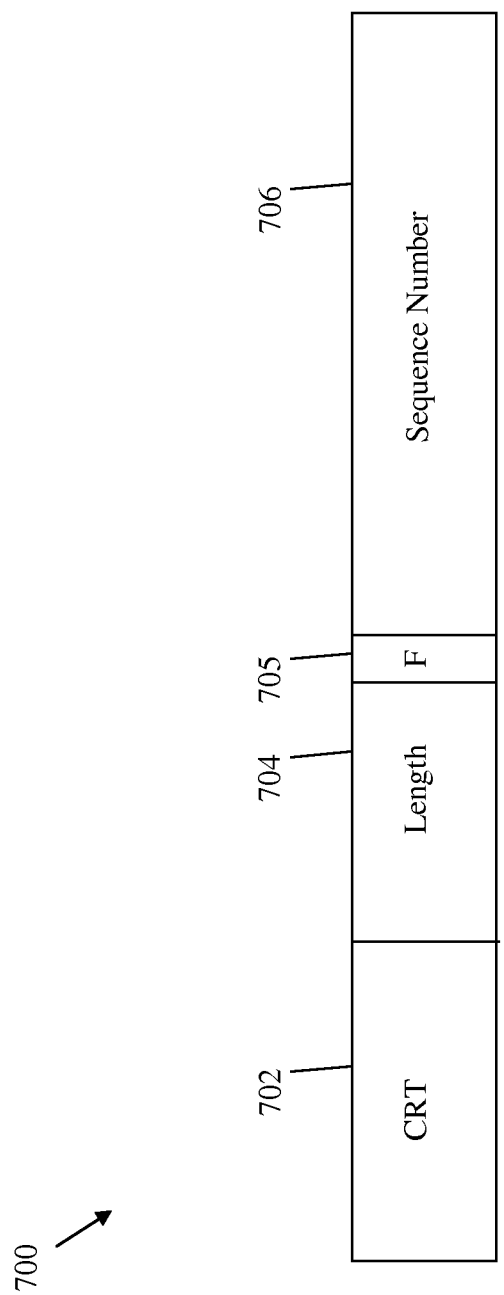
FIG. 7 is a schematic diagram of an embodiment of a cache and retransmission capability TLV.

FIG. 7 illustrates an embodiment of a cache and retransmission capability TLV 700 that may be sent by the ingress node to the egress node to indicate whether the ingress node may support packet caching and retransmission. The ingress node may send the cache and retransmission capability TLV 700 in a label mapping message to the egress node upon establishing a PW link between the two nodes. The cache and retransmission capability TLV 700 may comprise a cache and retransmission type (CRT) field 702, a length field 704, a flag (F) bit 705, and a sequence number 706. The CRT field 702 may indicate that the cache and retransmission capability TLV 700 is a cache and retransmission capability type TLV for advertising this capability or the lack of this capability. The CRT may be assigned by IANA. The length field 704 may be configured similar to the length field 404 and may have a size of about seven bits. The F bit 705 may be set to about one to indicate that the ingress node supports caching and retransmission. Alternatively, the F bit may be set to about zero to indicate that the ingress node supports retransmission but is not enabled or configured for caching.

If the egress node receives the cache and retransmission capability TLV 700 that confirms the caching and retransmission capability of the ingress node, e.g., that comprises an F bit 705 set to about one, the egress node may return a similar cache and retransmission capability TLV 700. Thus, the ingress node may activate the caching function and begin caching packets before transmission. If the egress node does not return a cache retransmission capability message TLV 700, then the caching function may not be activated and the ingress node may transmit packets without caching. In some embodiments, the egress node may send a cache and retransmission capability TLV 700 to the ingress node at any point after the start of packet transmission over the PW to activate the caching function at the ingress node.

Figure 8A:
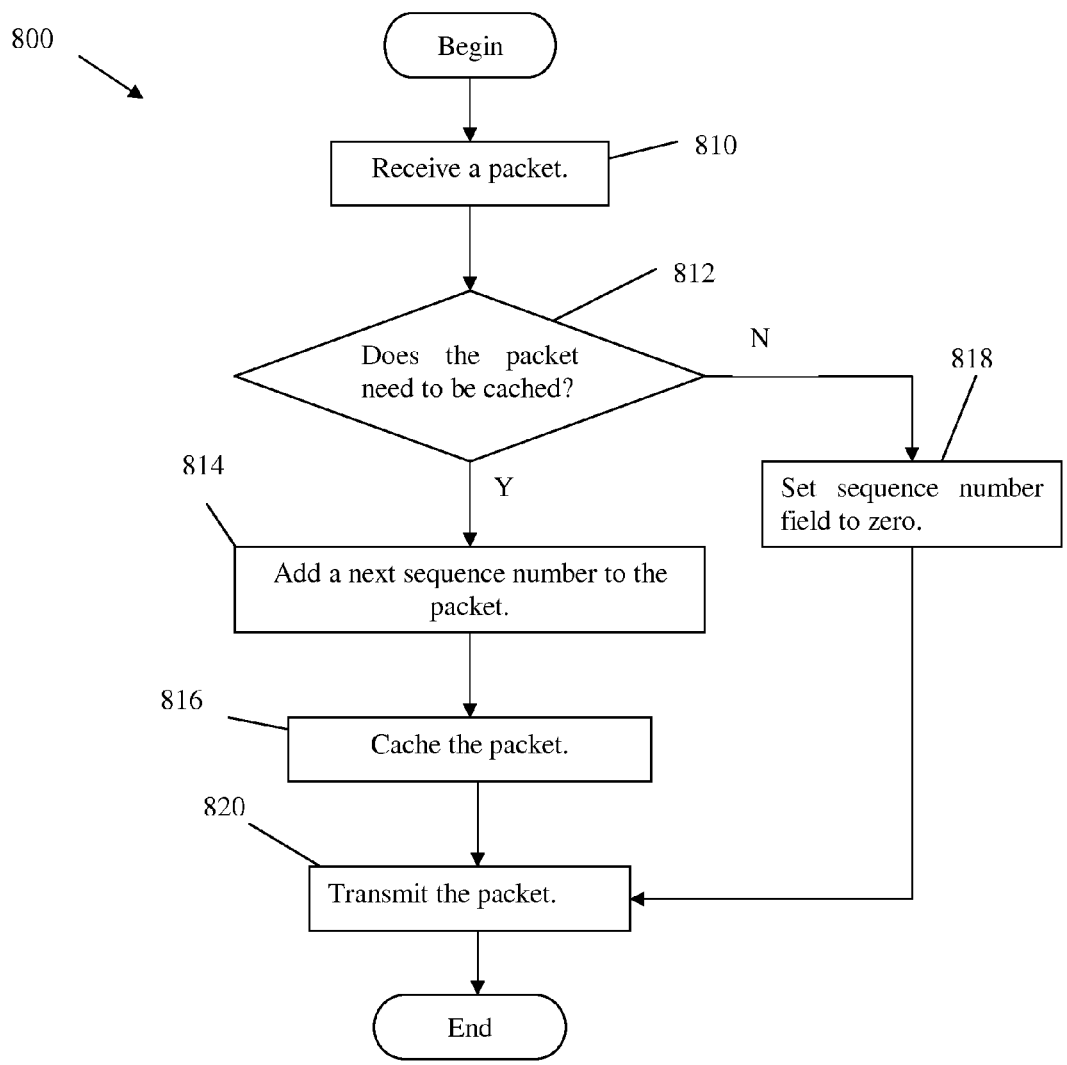
FIG. 8A is a flowchart of an embodiment of a packet caching method.

FIG. 8A illustrates an embodiment of a packet caching method 800 that may be implemented by the ingress node to cache a plurality of packets before transmission. The method 800 may begin at block 810, where a packet may be received. The packet may be received by an ingress node or PE (e.g., the PE1 110 or SPE1 214) from a CE as part of a sequence of packets. At block 812, it is determined whether the packet needs to be cached. If no, then the method proceeds to block 818 where the sequence number field is set to zero. The method then proceeds to block 820 where the packet may be transmitted. If, in block 812, it is determined that the packet does need to be cached, then at block 814, a next sequence number may be added to the packet. The next sequence number may be equal to a sequence number that was added to a previous packet in the sequence incremented by about one. At block 816, the packet may be cached, e.g., in the table 310. At block 820, the packet may be transmitted. The ingress node may transmit the packet to an egress node or PE (e.g., the PE2 112 or SPE2 216) via a PW. The method 800 may then end. The ingress node may repeat the steps of the method 800 until all the packets from the CE are received, cached, and transmitted.

Figure 8B:
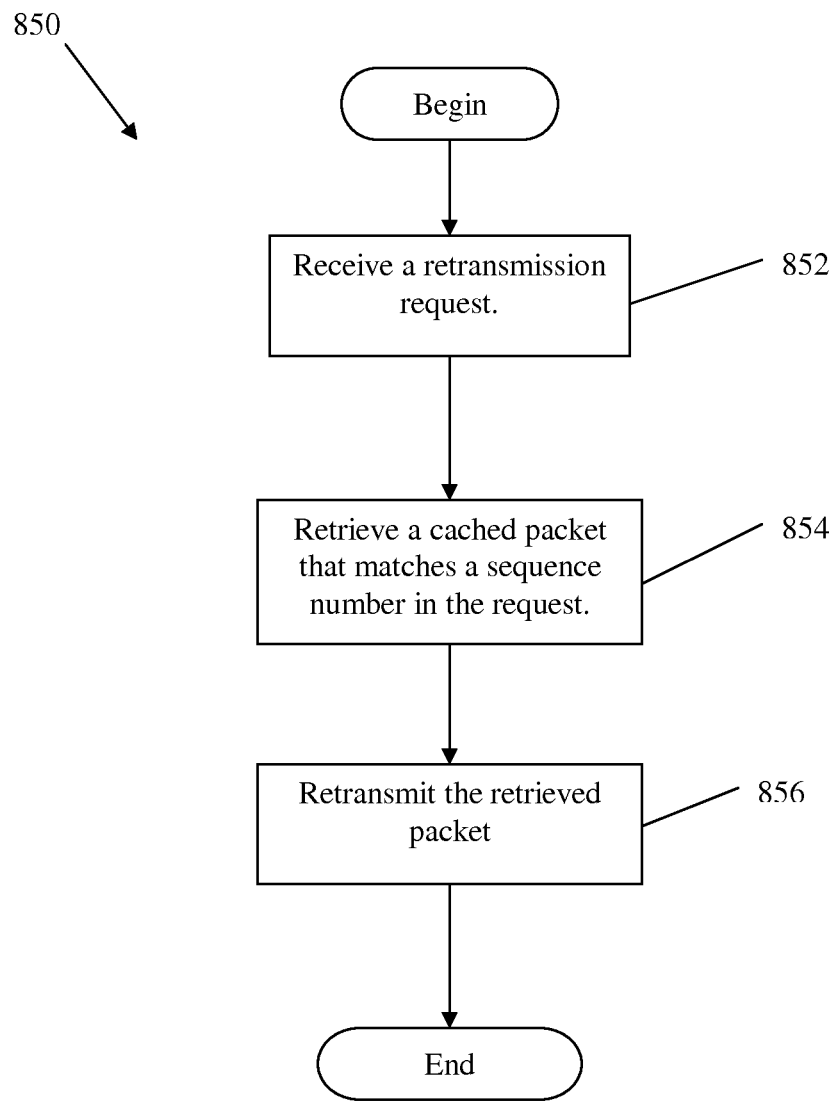
FIG. 8B is a flowchart of an embodiment of a retransmitting a packet method.

FIG. 8B illustrates an embodiment of a retransmitting a packet method 850 that may be implemented by the ingress node to retransmit a packet if a retransmit packet request is received from an egress node. At block 852, the method 800 may receive a retransmission request, e.g., such as in a retransmission TLV 400 or 500 from the egress node or PE. At block 854, a cached packet that matches a sequence number in the request may be retrieved. The ingress node may retrieve the cached packet that comprises the same sequence number indicated in the retransmission request or TLV from the egress node. At block 856, the retrieved packet may be retransmitted. The method 850 may then end.

Figure 9:
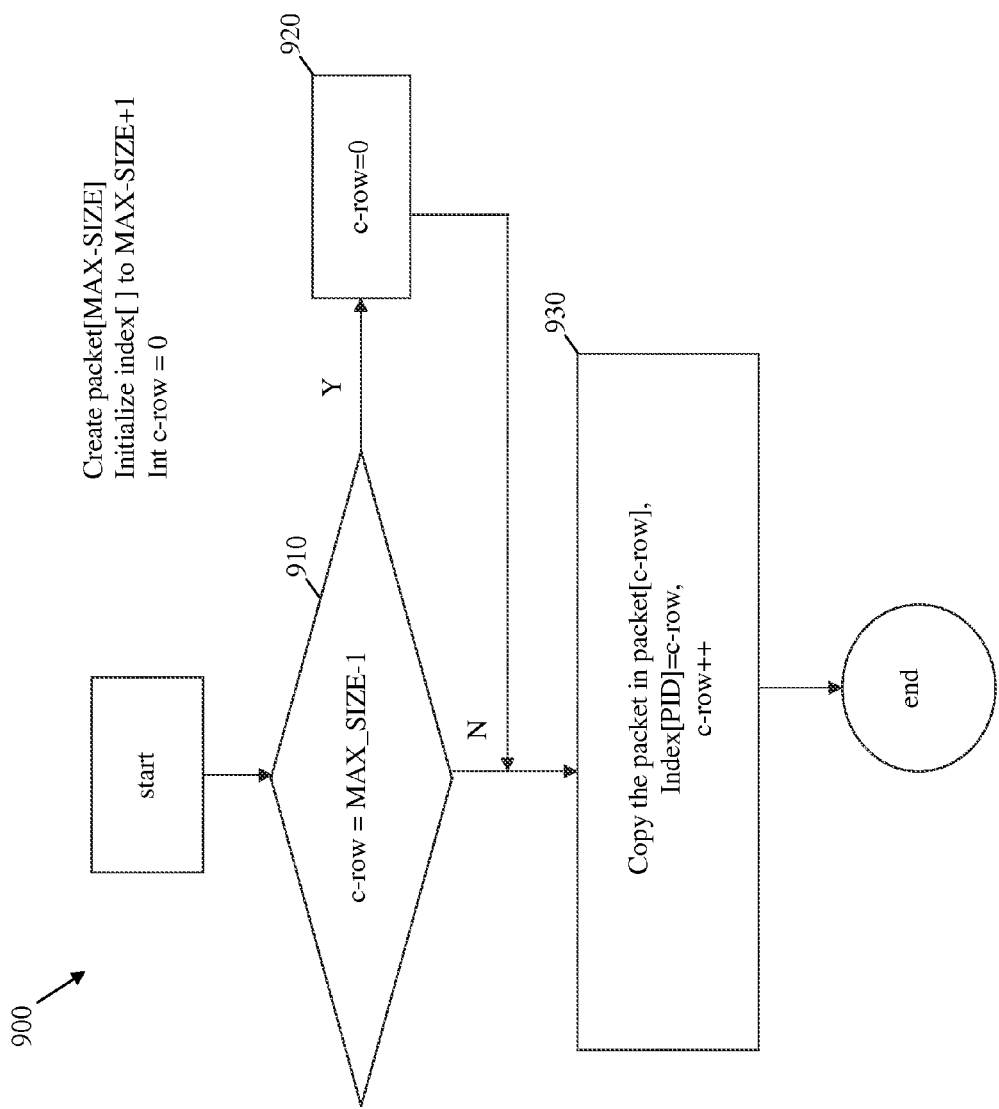
FIG. 9 is a flowchart of an embodiment of a packet caching method.

FIG. 9 illustrates an embodiment of a packet caching method 900 that may be implemented by the ingress node to cache a packet before transmission. For instance, the packet caching method 900 may be implemented at block 830 above. The method 900 may be initiated by initializing a list or table or rows for caching the packets that has a maximum determined size (e.g., Create packet[MAX-SIZE]), initializing a list of indexes that has the maximum determined size incremented by about one (e.g., Initialize index[ ] to MAX-SIZE+1), and setting an integer row count to about zero (e.g., Int c-row=0).

The method 900 may start at block 910, where the method 900 may determine whether the row count is equal to the maximum size less about one (e.g., c-row=MAX-SIZE−1). If the condition in block 910 is true, than the method 900 may proceed to block 920. In this case, the quantity of cached packets has reached the maximum size of the cache memory and the cache may need to be reset. Otherwise, the method 900 may proceed to block 930. At block 920, the row count may be reset to about zero (e.g., c-row=0). The method 900 may then end. At block 930, the packet may be cached by copying the packet to a row in the table that has an index equal to the row count (e.g., Copy the packet in packet[c-row]). Additionally, an index in the list of indexes that matches the PID in the packet may be set to the row count (e.g., Index [PID]=c-row), and the row count may then be incremented by about one (e.g., c-row++). The method 900 may then end.

Figure 10:
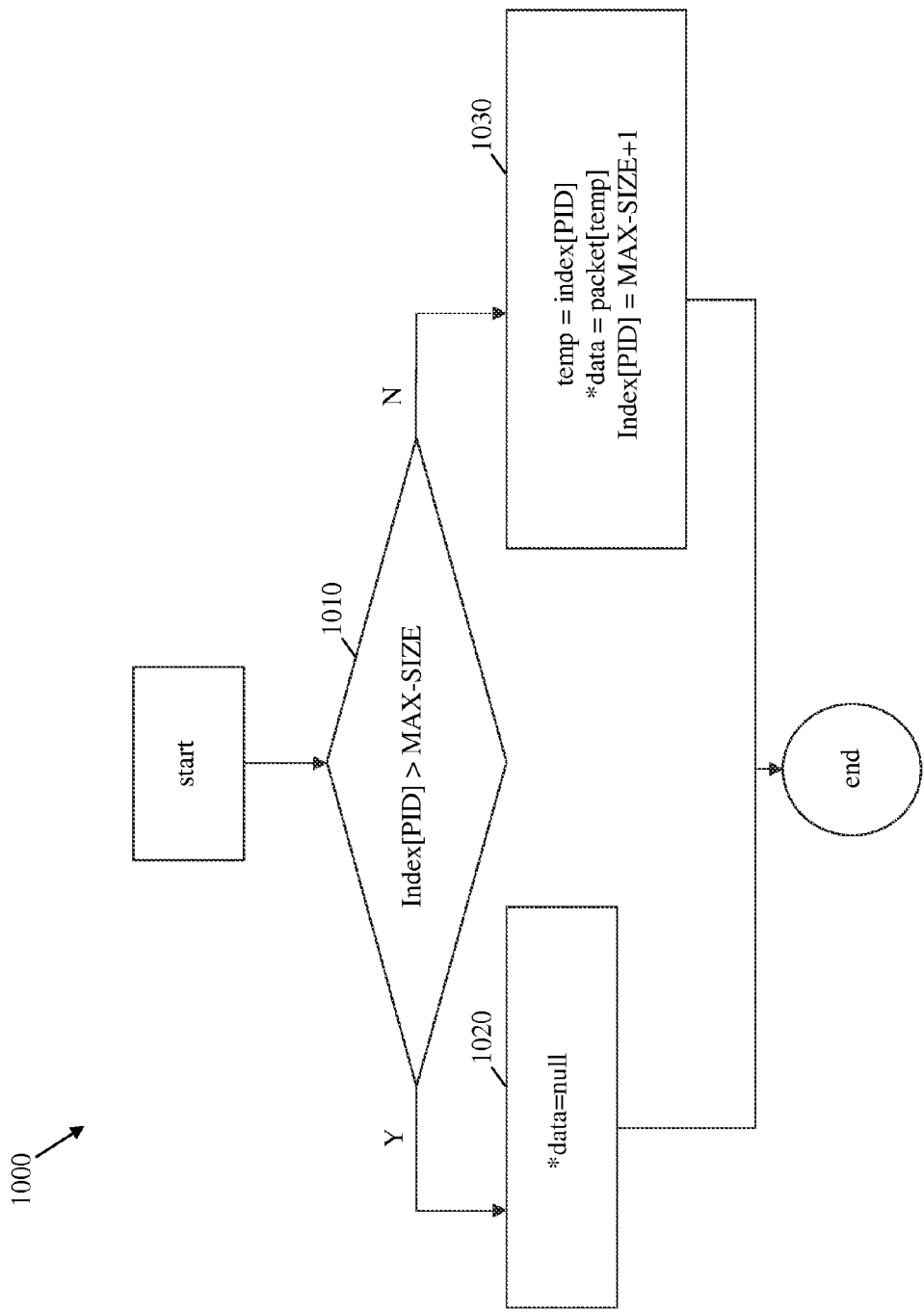
FIG. 10 is a flowchart of an embodiment of a packet retrieval method.

FIG. 10 illustrates an embodiment of a packet retrieval method 1000 that may be implemented by the ingress node to retrieve a packet that may be lost and requested by the egress node. For instance, the packet retrieval method 1000 may be implemented at block 870 above. The method 1000 may use the same parameters initiated and used in the method 900 above. The method 1000 may start at block 1010, where the method 1000 may determine whether an index in the list of indexes that matches the PID indicated in the request from the egress node is greater than the maximum size (e.g., Index [PID]>c-row). If the condition in block 1010 is true, than the method 1000 may proceed to block 1020. In this case, the PID in the request from the egress node may correspond to a packet that is not cached or that is removed from the cache. Otherwise, the method 1000 may proceed to block 1030.

At block 1020, the data retrieved may be set to null since the packet retrieval request may not be fulfilled (e.g. *data=null). The method 1000 may then end. At block 1030, the packet that matches the requested PID may be retrieved. As such, a temp value may be set to an index in the list of indexes that matches the PID in the request from the egress node (e.g., temp=index[PID]), and the data retrieved may be retrieved from a row in the table that has an index equal to the temp value (e.g., *data=packet[temp]). Subsequently, the index in the list of indexes that matches the PID in the request from the egress node may be set to the maximum size incremented by about one (e.g., index[PID]=MAX-SIZE+1). The method 1000 may then end.

Figure 11:
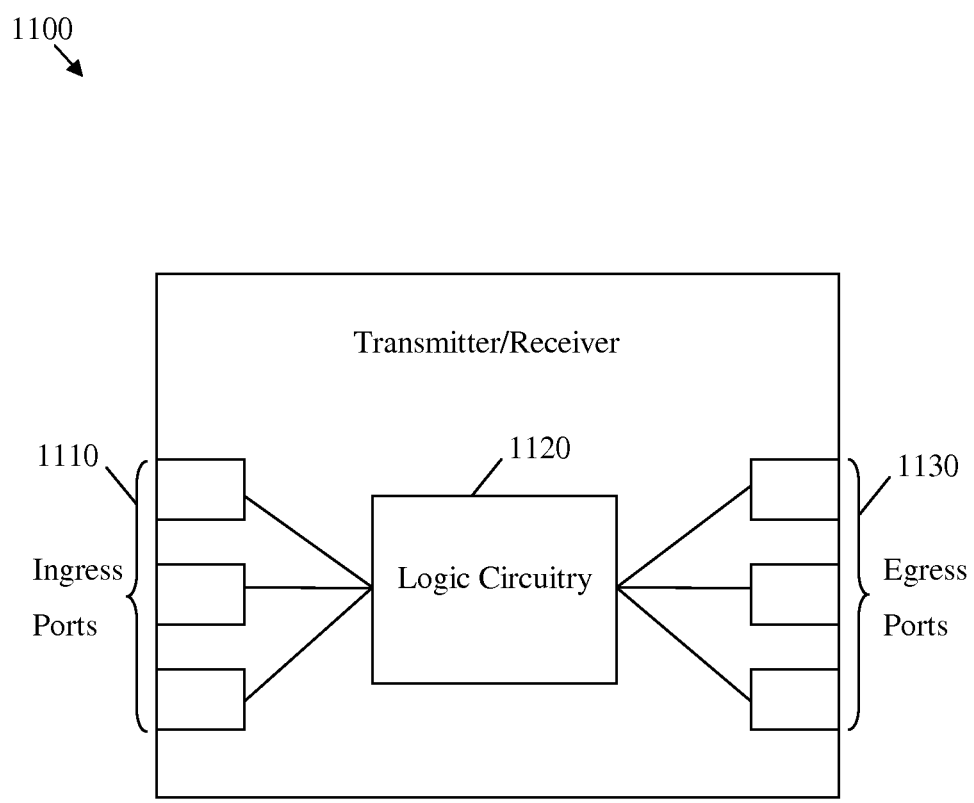
FIG. 11 is a schematic diagram of an embodiment of a transmitter/receiver unit.

FIG. 11 illustrates an embodiment of a network component 1100, which may be any device that transports packets and/or contents through a network. For instance, the network component 1100 may be located at or may correspond to the PE1 110. The network component 1100 may comprise one or more ingress ports or units 1110 for receiving content, packets, objects, and/or type-length-values (TLVs) from other network components, logic circuitry 1120 to determine which network components to send the packets to, and one or more egress ports or units 1130 for transmitting frames to the other network components. The network component 1100 may also implement the packet caching method 400 and the packet retrieving method 500.

Figure 12:
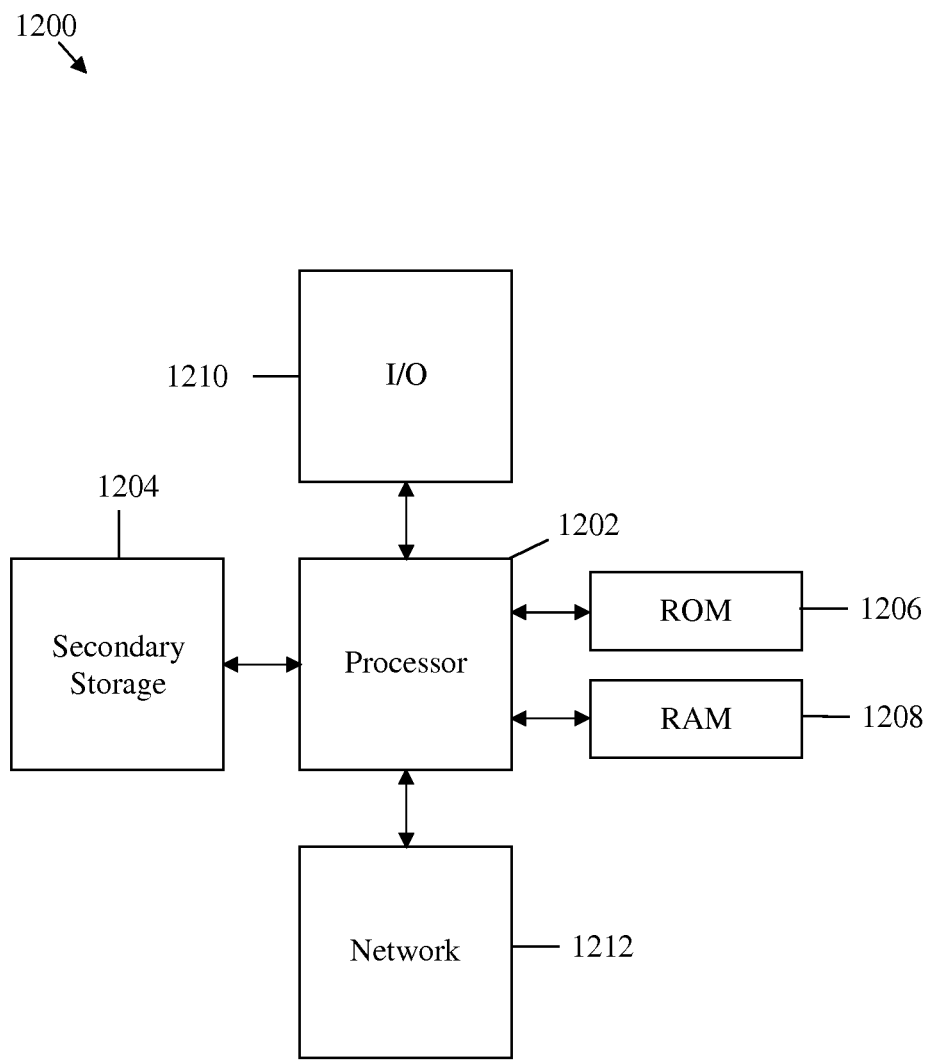
FIG. 12 is a schematic diagram of an embodiment of a general-purpose network component.

The network components described above may be implemented on any general-purpose network component, such as a computer or network component with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor 1202 may be implemented as one or more CPU chips, or may be part of one or more application specific integrated circuits (ASICs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, ..., 70 percent, 71 percent, 72 percent, ..., 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
an ingress node configured to couple to an egress node and to:
cache a plurality of cached packets within the ingress node;
encapsulate an identifier within each of the cached packets that indicates the cached packets have been cached by the ingress node;
advertise a message that indicates an ability to cache the cached packets and retransmit the cached packets;
transmit a plurality of non-cached packets to the egress node via a pseudowire (PW) when the ingress node does not receive a response to the message from the egress node;
transmit the cached packets to an egress node via the PW when the ingress node receives the response to the message from the egress node; and
retransmit one of the cached packets that has been cached based on a request received from the egress node,
wherein the request indicates that the one of the cached packets has not been received by the egress node.

2. The apparatus of claim 1, wherein the ingress node is a first provider edge (PE) in a Multi-Protocol Label Switching (MPLS) network, and wherein the egress node is a second PE in the MPLS network that is coupled to the first PE via the PW.

3. The apparatus of claim 1, wherein the ingress node is a first segment provider edge (SPE) in a first Multi-Protocol Label Switching (MPLS) network domain, and wherein the egress node is a second SPE in a second MPLS network domain that is coupled to the first SPE via the PW.

4. The apparatus of claim 3, wherein the first SPE is coupled to a first terminal provider edge (TPE) in the first MPLS network domain via a second PW attachment circuit (AC) and receives the packets from the first TPE, and wherein the second SPE is coupled to a second TPE in the second MPLS network domain via a second PW and sends the packets to the second TPE.

5. The apparatus of claim 1, wherein each of the identifiers are sequence numbers that track the order of when each of the packets are transmitted to the egress node, wherein the ingress node is further configured to assign a value to each of the sequence numbers that is greater than or equal to one when the packets are cached, and wherein each of the non-cached packets comprise a sequence number with a value of less than one.

6. The apparatus of claim 1, wherein the request message further comprises a second identifier that identifies which cached packets transmitted by the ingress node are lost, wherein the cached packets are cached as a table that comprises an index list, wherein the index list comprises a plurality of row numbers that are mapped to the identifiers for each of the cached packets, and wherein the ingress node is further configured to obtain the one of the cached packets from the table using the second identifier located within the request message.

7. A network component comprising:
a receiver configured to:
receive a plurality of packets;
a cache memory configured to:
store at least some of the packets as a plurality of cache packets within the cache memory; and
assign a packet identifier (PID) to each of the cached packets;
a logic circuitry configured to:
receive a request message that indicates at least one of the cached packets is lost; and
retrieve the at least one of the cached packets from the cache memory that matches the PID of the packet; and
a transmitter configured to:
advertise a message that indicates an ability for the network component to cache the cached packets and retransmit the cached packets;
transmit the cached packets via a pseudowire (PW) when the network component receives a response to the message that indicates support for the cached packets;
transmit a plurality of non-cached packets via the PW when the network component does not receive a response to the message that indicates support for the cached packets; and
re-transmit the at least one of the cached packets when the logic circuitry receives the request message,
wherein the PID indicates the cached packet has been stored in the cache memory.

8. The network component of claim 7, wherein the cache memory comprises a table for caching the cached packets and an index list for indexing a plurality of entries in the table, and wherein the index list is used to map a table row to the PID.

9. The network component of claim 8, wherein the table stores a maximum size of total packet data that is determined by a transmission delay, and wherein the index list comprises a quantity of entries equal to about the quantity of entries in the table incremented by about one.

10. The network component of claim 7, wherein the request message is a received retransmission type-length-value (TLV) that comprises a sequence numbers field that indicates the PID, and a corresponding bitmask of following lost packets (BLP) field that indicates whether a second packet following the at least one of the cached packets is lost.

11. The network component of claim 10, wherein the request message further comprises a flag (F) bit, a first sequence number field and a last sequence number field, and wherein the first sequence number field and the last sequence number field define a range of sequence numbers for a sequence of lost cached packets when the F bit is set.

12. The network component of claim 7, wherein each of the cached packets comprise a retransmission control word (CW) that is used to differentiate when the cached packet is retransmitted and when the cached packet is initially transmitted, wherein the retransmission CW comprises a sequence of bits, and wherein one of the bits in the sequence of bits is set to indicate whether the packet is being retransmitted or initially transmitted.

13. The network component of claim 7, wherein the retransmitted cached packet is sent as one of the non-cached packets to an egress node and the sequence number in the retransmitted packet is set to zero.

14. A method performed at an ingress node, the method comprising:
    receiving a plurality of packets;
    caching at least some of the packets as a plurality of cached packets in a cache memory;
    adding a next sequence number to the each of the cached packets;
    advertising a message that identifies an ability to cache the cached packets and retransmit the cached packets;
    transmitting the cached packets via a pseudowire (PW) after receiving a response to the message that indicates support for the cached packets;
    transmitting a plurality of non-cached packets via the PW when the ingress node does not receive the response to the message that indicates support for the cached packets; and
    retransmitting the at least one of the cached packets when a request to retransmit the at least one of the cached packets is received,
    wherein the request to retransmit the at least one of the cached packets indicates the next sequence number of the at least one of the cached packets to retransmit, and
    wherein the next sequence number for each of the cached packets indicates that the cached packets have been stored in cache memory.

15. The method of claim 14, further comprising transmitting a second packet that comprises a prior sequence number before transmitting one of the cached packets, caching the second packet within the cache memory, wherein the prior sequence number is greater than the next sequence number within the one of the cached packets, and wherein the use of the cache memory's storage space has reached a maximum capacity after caching the second packet.

16. The method of claim 15, wherein the next sequence number within the one of the cached packets is reset to about one, and wherein the cache is reset by removing a previously cached packet associated with the next sequence number.

17. The method of claim 14, wherein the one of the cached packets is not retransmitted when the next sequence number indicated in the request does not map to any packet stored in the cache memory.

18. The method of claim 14, wherein the message is a cache and retransmission capability type-length-value (TLV) that comprises a cache and retransmission type (CRT) field, a length field, a flag (F) bit, and a sequence number, and wherein the F bit is set to indicate supporting caching and retransmission or is not set to indicate supporting retransmission without caching.

19. The method of claim 14, further comprising assigning a default sequence number that identifies the non-cached packets and encapsulating the default sequence number within the non-cached packets.

20. The method of claim 14, further comprising resetting the next sequence number to a starting value when a number of cached packets transmitted exceeds a number of entries within the cached memory.

* * * * *